United States Patent

[11] 3,630,666

[72] Inventor Lorenz V. Kunkel
       Tulsa, Okla.
[21] Appl. No. 846,101
[22] Filed July 30, 1969
[45] Patented Dec. 28, 1971
[73] Assignee Amoco Production Company
       Tulsa, Okla.

[54] PRECONTACTING HYDROGEN SULFIDE CONTAINING GAS STREAMS WITH RICH SULFINOL
10 Claims, 1 Drawing Fig.

[52] U.S. Cl. ........................................... 23/2 R,
       23/3 R, 208/340
[51] Int. Cl. ................................................ B01d 53/34
[50] Field of Search ........................................ 23/2, 2.3, 3,
       3.3; 208/340

[56] References Cited
UNITED STATES PATENTS

| | | | |
|---|---|---|---|
| 2,866,679 | 12/1958 | Lamont ........................ | 23/3 |
| 3,347,621 | 10/1967 | Papadopoulos et al. ........ | 23/3 X |

*Primary Examiner*—Earl C. Thomas
*Attorneys*—Paul F. Hawley and Arthur McIllroy ABSTRACT: The efficiency of a gas-sweetening system is improved by first separating a high-pressure field sour gas into a gas and a liquid stream, sending the liquid stream to a flash tank to obtain separate liquid and sour gas fractions. The latter is then combined with rich absorbent solution from the high-pressure contactor acting on the first mentioned high-pressure gas stream. The higher hydrogen sulfide partial pressure in the aforesaid sour gas fraction causes physical solution of the $H_2S$ resulting in lessening the load on the downstream low-pressure contactor. By operating in this fashion the sweetening agent circulation rate to the contactors is approximately 30 percent less than required by conventional methods.

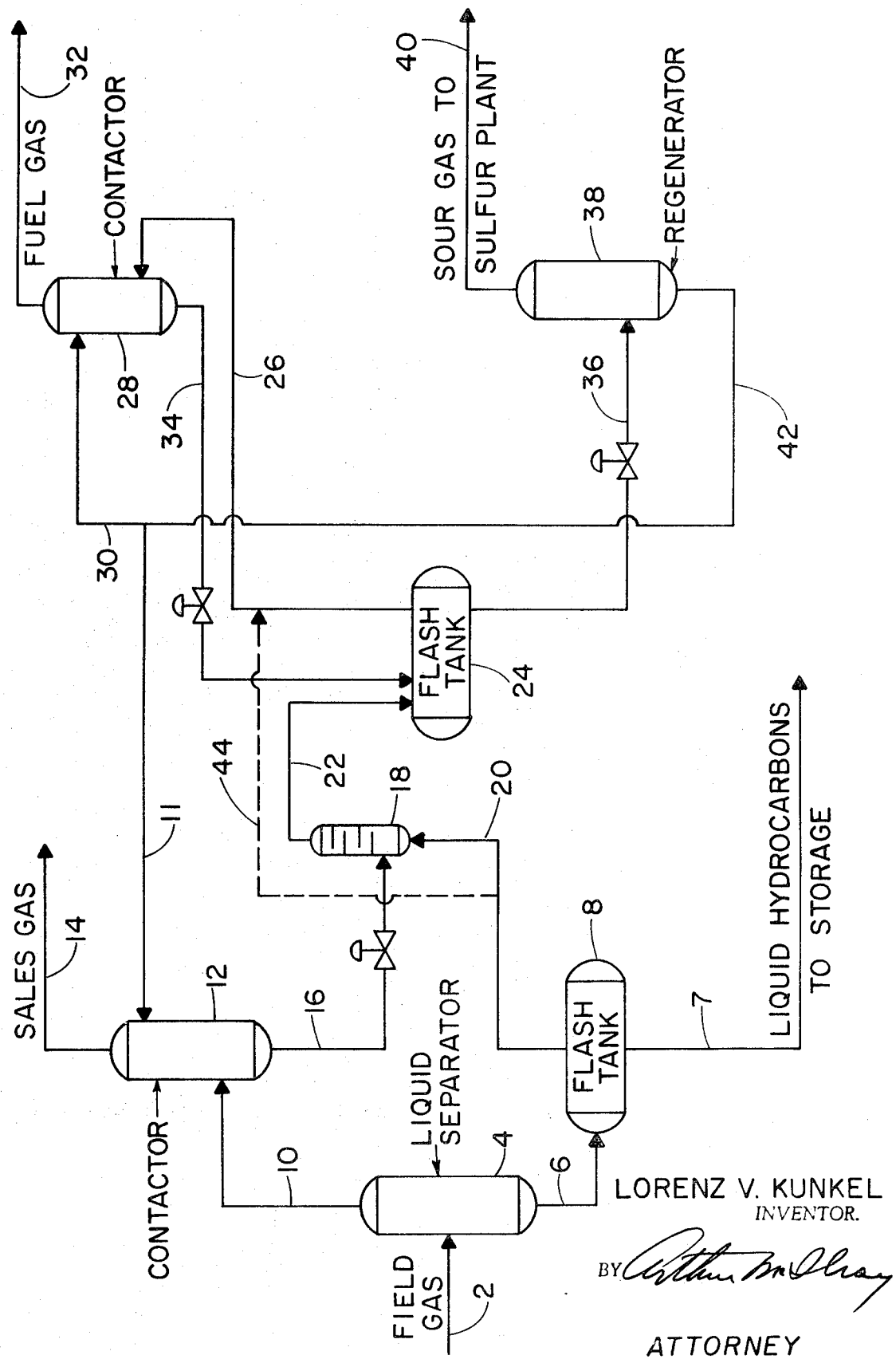

PRECONTACTING HYDROGEN SULFIDE CONTAINING GAS STREAMS WITH RICH SULFINOL

The present invention relates to a method for removal of acidic gases such as, for example, hydrogen sulfide and carbon dioxide, from gases or liquids such as hydrogen, nitrogen, oxygen, and light hydrocarbons. Basically, this separation is affected by contacting the acid gas-containing mixture with an aqueous solvent for hydrogen sulfide and/or carbon dioxide, such as a suitable alkylol amine, an aqueous phosphate sulfate solution, a sulfolane solution, or mixture of any of the above solvents, e.g. sulfolane with an aqueous alkylol amine solution.

BACKGROUND OF THE INVENTION

In carrying out procedures of this kind the gas or liquid from which the hydrogen sulfide and/or carbon dioxide are to be removed is countercurrently contacted with a solvent or absorbent liquid that functions as a selective solvent for the acidic components. Frequently, separation of the hydrogen sulfide and/or carbon dioxide does not have to be complete. Usually a product has to be applied that meets certain specifications.

The purified product and charged solvent are drawn from the separation zone. The charged solvent is regenerated by passing it to a stripping zone, in which it is at least substantially freed from the absorbed components by pressure reduction and heating. The solvent thus regenerated is returned, at least substantially, to the separation zone, usually after being previously cooled to a suitable lower temperature by means of heat exchange and/or cooling.

For example in the removal of carbon dioxide and hydrogen sulfide present in natural gas, the latter, after separating the normally liquid or higher molecular weight hydrocarbons therefrom, is subjected to countercurrent contacting in a fractionation column with a solution containing, for example, about 40 percent diisopropanol amine, 45 percent sulfolane, and 15 percent water, such solution or solutions of similar composition hereinafter being referred to as a "Sulfinol solution." This contacting or extraction step is usually carried out under pressure, e.g. approximately 1,000 p.s.i.a. at about 118° to 180° F. The hydrogen sulfide and carbon dioxide present are selectively dissolved into the Sulfinol solution, this being aided by the high partial pressure of these acidic components. Solution also takes place due to chemical reaction with the diisopropanol amine —particularly where relatively low partial pressures are encountered.

In the case of a field operation the gas comes into the plant generally at high pressures, e.g. 1,000 to 1,200 p.s.i.a. and is sent to an inlet liquid separator. The liquid portion from the separator is taken to a flash tank where acid gas is removed at a pressure of 200 to 300 p.s.i.a. This stream may contain as much as 75 to 80 percent hydrogen sulfide. Ordinarily these vapors are processed in a Sulfinol flash gas contactor, but this increases the vapor and liquid loads on the contactor increasing its size and requiring more Sulfinol circulation. Alternatively, this vapor stream may be compressed up to the pressure of the incoming field gas and sent to the high pressure contacting tower used for treatment of the vapor stream coming off the inlet liquid separator mentioned above. This course of treatment, however, is costly both from the standpoint of initial investment and additional maintenance expense.

SUMMARY OF THE INVENTION

In accordance with my invention, I propose to avoid the above-mentioned disadvantages by mixing the acid gas-rich absorbent stream from the aforesaid high pressure contactor with the acid gas-containing stream generated by flashing the liquid portion coming from the inlet liquid separator under conditions such that large amounts of aforesaid gas are dissolved in said rich absorbent stream prior to further contacting with additional solvent. To accomplish the solution of the acidic components in the rich absorbent stream by physical solubility, the acid gas partial pressure must be substantially higher than that of the rich absorbent stream. Thus, to obtain appreciable solution, the acid gas partial pressure in the flashed gas should be at least about 15 p.s.i.a. and preferably from about 15 to about 500 p.s.i.a. greater in the gas phase than in the liquid phase. The resulting acid gas-enriched solvent is then transferred to a flash tank operated at about, for example, 300 p.s.i.a. and 185° F. to remove a gaseous stream rich in hydrogen sulfide which is then sent to a second contactor operating at about 300 p.s.i.a. where said gaseous stream is thoroughly contacted with a suitable absorbent solution. This solution, rich in hydrogen sulfide, is combined with the liquid portion coming from the above-mentioned flash tank and sent to an absorbent regenerating column where a gas containing 75 to 90 percent hydrogen sulfide is taken from the top of the column and sent to further processing in, for example, a Claus sulfur recovery plant and the lean absorbent solution is recycled to the contacting columns for further use.

DESCRIPTION OF THE DRAWING

The process of my invention will be further illustrated by reference to the accompanying flow diagram wherein the absorbent employed is Sulfinol. While Sulfinol is used as the absorbent solution in this particular example, it will be apparent that any of the common liquid absorbents ordinarily employed for such purposes could be substituted therefor, inasmuch as the principle of this invention is equally applicable thereto.

In the process illustrated a gaseous mixture containing light hydrocarbons, hydrogen sulfide, and carbon dioxide comes into the system through line 2 at a pressure of 980 p.s.i.a. and 110° F. This mixture is conducted into inlet liquid separator 4 at the rate of 4,500,000 standard cubic feet per hour and has the following composition.

| Component | Mol % |
|---|---|
| $C_1$ | 48.659 |
| $C_2$ | 2.106 |
| Benzene | 0.004 |
| Toluene | 0.004 |
| $N_2$ | 1.847 |
| $H_2S$ | 38.496 |
| $CO_2$ | 8.884 |

The liquid portion of this stream is withdrawn through line 6 at 49 g.p.m. and sent to flash tank 8 at 313 p.s.i.a. and 110° F. where 36 g.p.m. of a liquid hydrocarbon stream is taken off and sent to storage via line 7. Means not shown may be provided for separation of any water present in line 6 before the contents thereof are taken to flash tank 8. Overhead from separator 4 is taken through line 10 at a rate of 4,360,000 standard cubic feet per hour to contactor 12 held at a pressure of about 970 p.s.i.a. and a temperature of about 115° F. In operation of contactor 12 a lean Sulfinol solution is fed in the top of the column at a rate of 3,678 g.p.m. through line 11. From the top of contactor 12 sales gas is withdrawn at the rate of 2,190,000 standard cubic feet per hour through line 14. A rich Sulfinol solution is taken from contactor 12 via line 16 and flows into mixing vessel 18 where it contacts a gaseous stream containing about 72 percent hydrogen sulfide and the balance primarily carbon dioxide and light hydrocarbons coming from flash tank 8 via line 20. The stream in line 20 has the following composition.

| Component | Mol % |
|---|---|
| $C_1$ | 16.379 |
| $C_2-C_4$ | 2.837 |
| Benzene | 0.002 |
| Toluene | 0.002 |
| $N_2$ | 0.246 |
| $H_2S$ | 72.147 |
| $CO_2$ | 8.387 |

The hydrogen sulfide-rich Sulfinol solution is then transferred through line 22 to flash tank 24. The latter is operated at about 310 p.s.i.a. and 181° F. From the top of tank 24 an acid gas streams flows through line 26 at a rate of 252,000 standard cubic feet per hour to a low-pressure or fuel gas contactor 28 where said stream is thoroughly mixed with a lean Sulfinol stream fed to the top of contactor 28 through line 30 at the rate of 228 g.p.m. Contactor 28 is operated at about 300 p.s.i.a. and 118° F. Fuel gas is removed from the top of contactor 28 through line 32 at a rate of 102,000 cubic feet per hour while a hydrogen sulfide-rich stream is taken off as bottoms at the rate of 246 g.p.m. via line 34 and transferred to flash tank 24. From the latter the combined Sulfinol streams from contactors 12 and 28 are withdrawn at the rate of 4,086 g.p.m. through line 36 and sent to regenerator 38 operated at 270° F. and 28 p.s.i.a. Sour gas having the following components is taken off the top of regenerator column 38 through line 40 and sent to a Claus sulfur plant for further processing. This stream has the following components:

| Component | Weight % |
| --- | --- |
| $C_1$ | 0.674 |
| $C_2$–$C_6$ | 0.171 |
| Benzene | 0.008 |
| Toluene | 0.008 |
| $N_2$ | 0.006 |
| $H_2S$ | 80.854 |
| $CO_2$ | 18.279 |

The bottom in regenerator 38, consisting of lean Sulfinol, is withdrawn at the rate of 3,906 g.p.m. via line 42 and then recycled to contactors 12 and 28 through lines 11 and 30, respectively, at the previously stated rates.

Prior practice in handling hydrogen sulfide rich Sulfinol stream is illustrated by dashed line 44 wherein the gaseous stream from flash tank 8 flows directly into line 26 going to contactor 28. Using the procedure, i.e., bypassing flash tank 24, with flashed gas flowing into contactor 28 via lines 44 and 26, the hydrogen sulfide-containing gas stream in line 40 has the following components:

| Component | Weight % |
| --- | --- |
| $C_1$ | 0.655 |
| $C_2$–$C_6$ | 0.168 |
| Benzene | 0.007 |
| Toluene | 0.007 |
| $N_2$ | 0.006 |
| $H_2S$ | 80.874 |
| $CO_2$ | 18.283 |

In this gas the acid gas from flash tank 8 does not have an opportunity to come into contact with additional Sulfinol prior to introduction into contactor 28. This, of course, places a greater load on the extraction operation in contactor 28 and requires a lean Sulfinol solution circulation rate of 314 g.p.m. through line 30 compared to only 228 g.p.m. when employing the concept of my invention, a circulation rate of about 30 percent more than required in the process claimed herein.

It will be seen that the composition of the stream in line 40 is essentially the same when either the process of my invention or the procedure involving bypassing of the rich Sulfinol flash tank (24) is employed. It is to be noted, however, that where my invention is used, such result is obtained with the circulation of 86 g.p.m. less Sulfinol than is required by use of the prior method.

From the foregoing description it will be apparent that the process of my invention has a number of advantages over existing methods including:

1. Substantial hydrogen sulfide and carbon dioxide are absorbed from the flash stabilizer vapors from flash tank 8 by the large stream of rich Sulfinol in line 16, thereby reducing the volume of vapor fed to the flash gas contactor 28.

2. Higher hydrogen sulfide and carbon dioxide loading of rich Sulfinol in flash tank 24 reduces the hydrocarbon content in acid gas stream 40.

3. Investment and operation expense are avoided for compression of sour gas to permit the required capacity to be provided.

4. Utilization of the capacity of the rich Sulfinol stream in line 16 to remove additional hydrogen sulfide from the stream in line 20 results in a substantial increase in plant acid gas production capacity in existing plants.

I claim:

1. In a process for the removal of a normally gaseous acidic component from a fluid mixture thereof, wherein said mixture is subjected at superatmospheric pressure to a contacting step (1) with a normally liquid solvent for said component to produce a solution (1) rich in said component, and subjecting said solution to distillation to separate said component from said solvent, the improvement which comprises first subjecting said fluid mixture to a separation step whereby a gaseous and a liquid stream are obtained, subjecting said liquid stream to reduction in pressure whereby the normally gaseous components therein including acidic components are flashed to form a gaseous stream (1), combining gaseous stream (1) with solution (1) rich in said component at an acidic component partial pressure greater than that is said rich solution, separating the resulting mixture (1) into a gaseous stream (2) and a liquid stream (1), subjecting gaseous stream (2) to a contacting step (2) with a second portion of said solvent to produce a solution (2) rich in said acidic component, combining solution (2) with liquid stream (1), and thereafter subjecting the resulting mixture (2) thereof to distillation to obtain a normally gaseous overhead rich in said acidic component and a bottoms product of said solvent.

2. The process of claim 1 wherein said acidic component partial pressure is at least about 15 p.s.i. greater than that of the first mentioned solution rich in said acidic component.

3. The process of claim 1 in which the acidic component is hydrogen sulfide.

4. The process of claim 1 in which the acidic component consists initially of a mixture of hydrogen sulfide and carbon dioxide.

5. The process of claim 1 in which the acidic component is primarily carbon dioxide.

6. The process of claim 1 in which the fluid mixture is a sour natural gas.

7. The process of claim 1 in which the solvent employed is in the form of an aqueous solution.

8. The process of claim 7 in which the solvent is sulfolane.

9. The process of claim 8 in which the solvent consists essentially of a mixture of an alkylol amine and sulfolane.

10. The process of claim 9 in which the alkylol amine is diisopropanol amine.

* * * * *